Dec. 25, 1934.   E. W. WILSON   1,985,305
FARE REGISTERING AND CHANGE MAKING MACHINE
Filed Feb. 9, 1932     9 Sheets-Sheet 1

INVENTOR
Edwin W. Wilson
Jones, Addington, Ames & Siebold
ATTORNEYS

Dec. 25, 1934.  E. W. WILSON  1,985,305
FARE REGISTERING AND CHANGE MAKING MACHINE
Filed Feb. 9, 1932  9 Sheets-Sheet 2

Fig 4

INVENTOR
Edwin W. Wilson
Jones, Addington, Ames, & Seibold
ATTORNEYS

Dec. 25, 1934.  E. W. WILSON  1,985,305
FARE REGISTERING AND CHANGE MAKING MACHINE
Filed Feb. 9, 1932  9 Sheets-Sheet 3

INVENTOR
Edwin W. Wilson
Jones, Addington, Ames & Seibold
ATTORNEYS

Dec. 25, 1934.  E. W. WILSON  1,985,305
FARE REGISTERING AND CHANGE MAKING MACHINE
Filed Feb. 9, 1932    9 Sheets-Sheet 5

INVENTOR
Edwin W. Wilson
Jones, Addington, Ames & Seibold
ATTORNEYS

Dec. 25, 1934.  E. W. WILSON  1,985,305
FARE REGISTERING AND CHANGE MAKING MACHINE
Filed Feb. 9, 1932   9 Sheets-Sheet 6

INVENTOR
Edwin W Wilson
Jones, Addington, Ames & Seibold
ATTORNEYS

Dec. 25, 1934.　　　　E. W. WILSON　　　　1,985,305
FARE REGISTERING AND CHANGE MAKING MACHINE
Filed Feb. 9, 1932　　　9 Sheets-Sheet 8

Fig 20

INVENTOR
Edwin W Wilson
Jones, Addington, Ames & Seibold
ATTORNEYS

Dec. 25, 1934.  E. W. WILSON  1,985,305
FARE REGISTERING AND CHANGE MAKING MACHINE
Filed Feb. 9, 1932  9 Sheets-Sheet 9

INVENTOR
Edwin W. Wilson
Jones, Addington, Ames & Seibold
ATTORNEYS

Patented Dec. 25, 1934

1,985,305

UNITED STATES PATENT OFFICE 1,985,305

FARE REGISTERING AND CHANGE MAKING MACHINE

Edwin W. Wilson, Chicago, Ill., assignor to Louis L. Valentine, Chicago, Ill.

Application February 9, 1932, Serial No. 591,785

11 Claims. (Cl. 194—7)

This invention relates to fare collecting and money changing machines adapted to receive coins of different denominations and to retain a fixed amount from the coin deposited and to deliver change to the depositor. Machines of this type may be used in places where admission is charged, as for example, street cars, motor buses, theatres and the like, and in stores where commodities are sold, to minimize the human factor and the possibility of mistakes, being particularly well adapted for use where the collector has other duties to perform, such as on so-called "one-man cars" or "buses" where the motorman or driver is required to operate the vehicle, collect fares and make change.

The invention has to do with a simple and improved construction which is not only capable of receiving an exact amount, but which will return the necessary change whenever a passenger drops a coin therein of a denomination or value higher than the value of such amount, and for the purposes of elucidating the principles of the invention, the embodiment illustrated and described is arranged to operate upon a ten-cent basis, although any denomination of coin may be used as the basis by a simple rearrangement of circuit connections.

It is important in a machine of this character to avoid intricate and delicate mechanism incapable of functioning under vibration and strain, to which machines of this type are subjected. Automatic operation is also important. The specific embodiment herein illustrated and described is provided with certain features of novelty, which provide a simple and efficient construction capable of performing its duties without requiring such intricate and delicate mechanism, the machine being entirely automatic in its operation, and while not requiring the attention of the operator, will be at all times under his control to avoid the depositing of spurious coins, or to prevent unauthorized tampering therewith when the operator is compelled momentarily to leave the machine.

In this machine, the fare registering and coin ejecting mechanism is automatically set into operation by the dropping of coins into the different slots corresponding to the denominations of coins deposited. When deposited, each coin will remain, after setting the fare registering and coin ejecting mechanism into operation, visible to the operator and will so remain, until the deposit of the next coin, to eliminate possible dispute with the customer or passenger that a coin of larger denomination has been deposited. Coins deposited in the wrong slot will be promptly returned, of course, so that the depositor may immediately rectify his error. A noted advantage of the present machine resides in providing a simple form of removable coin carrier designed as a sub-assembly and having coin chambers or chutes for each denomination of coin the machine is adapted to receive. When the machine is employed on street cars or motor buses, the driver may load the coin carrier at the beginning of the day or trip and insert it in the machine so that the individual coin chambers will be kept constantly filled as fares are collected. Depositing a coin releases the previous coin for passage into its corresponding coin chamber, and quite obviously with this arrangement, the self-loading feature will normally prevent emptying of any individual coin chamber of the carrier during a trip. However, if any chamber is emptied, means are provided automatically to lock the machine against further use, by preventing the insertion of subsequent coins, and thereby serve notice to the driver that one or more chambers must be filled, thus positively eliminating any possibility of dispute with the customer or passenger that the machine failed to dispense sufficient change.

It is also essential to the success of a machine of this type that the fare register be rendered inoperative as well as the mechanism for receiving coins and making change, in the absence of the conductor or driver of the motor vehicle on which it is used, so that spurious coins may not be deposited to actuate the register and empty the coin chambers when the driver is not present. By providing a key lock at one side of the machine, the driver may temporarily lock the circuit open and simultaneously cause operation of automatic locking means preventing insertion of coins in the slots. Furthermore, the manually operable button making change for dollar pieces will then be rendered inoperative and the machine will be incapable of use.

By the arrangement provided herein, the coin last deposited will remain in sight of the operator for the purposes above explained and released upon deposit of the next coin. Accordingly, there is provided a simple form of device for clearing the passages or chutes in which the coins remain for inspection, so that at the end of a trip, the operator may quickly pass the last coin deposited into its chute, whereupon he may remove the coin carrier in which all the money deposited will then be contained.

Further objects and advantages of my invention will be apparent from the following detailed description taken in connection with the accompanying drawings which form a part hereof.

Exterior of the machine

Figure 1:
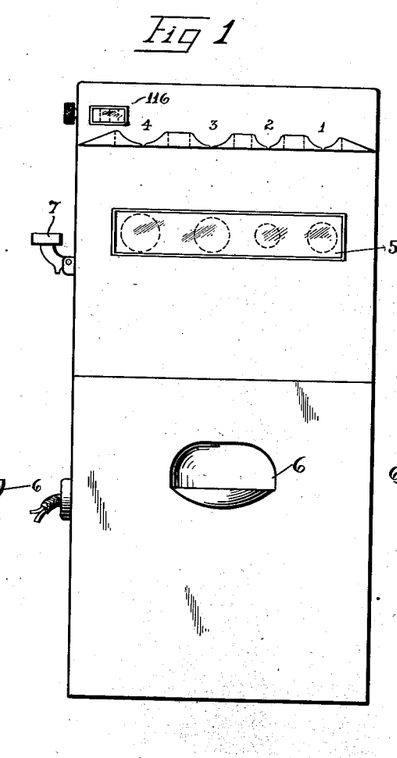
Figure 1 is a front elevation of a machine embodying the invention.

In the type of machine shown in Figs. 1 to 18, inclusive, slots 1, 2, 3 and 4 are provided to receive coins of the denominations of a nickel, dime, quarter and half-dollar, respectively. Such slots are preferably provided at the top of the machine and facing the front so that as the coin moves past the contacts of the circuit operating the fare register and coin-changing mechanism, they will drop downwardly and remain visible at window 5. As will be explained later, only the last coin deposited will remain at window 5, and consequently, the illustration of a coin of each denomination at window 5 in Fig. 1 is made really to show the manner in which each coin as deposited will remain visible.

At a reasonable distance below window 5, a cup 6 is provided to receive the change dispensed by the change making mechanism. A manually operable button 7 for registering a fare and making change for a dollar is preferably provided at the right hand side of the machine convenient to the operator.

Key 8 may be inserted in slot 9 located adjacent to button 7 for the purpose of closing the circuit to permit operation of the fare register and change making mechanism and to withdraw the locking mechanism preventing insertion of coins in slots 1 to 4, inclusive. Removing key 8 temporarily locks the circuit open and locks the slots 1 to 4, inclusive, against insertion of coins. This key may be inserted in key slot 10 to open door 11 provided in the opposite side of the machine for the purpose of inserting or removing the coin carrier.

Coin carrier

Figures 10, 11, 12, 13, 14, 15:
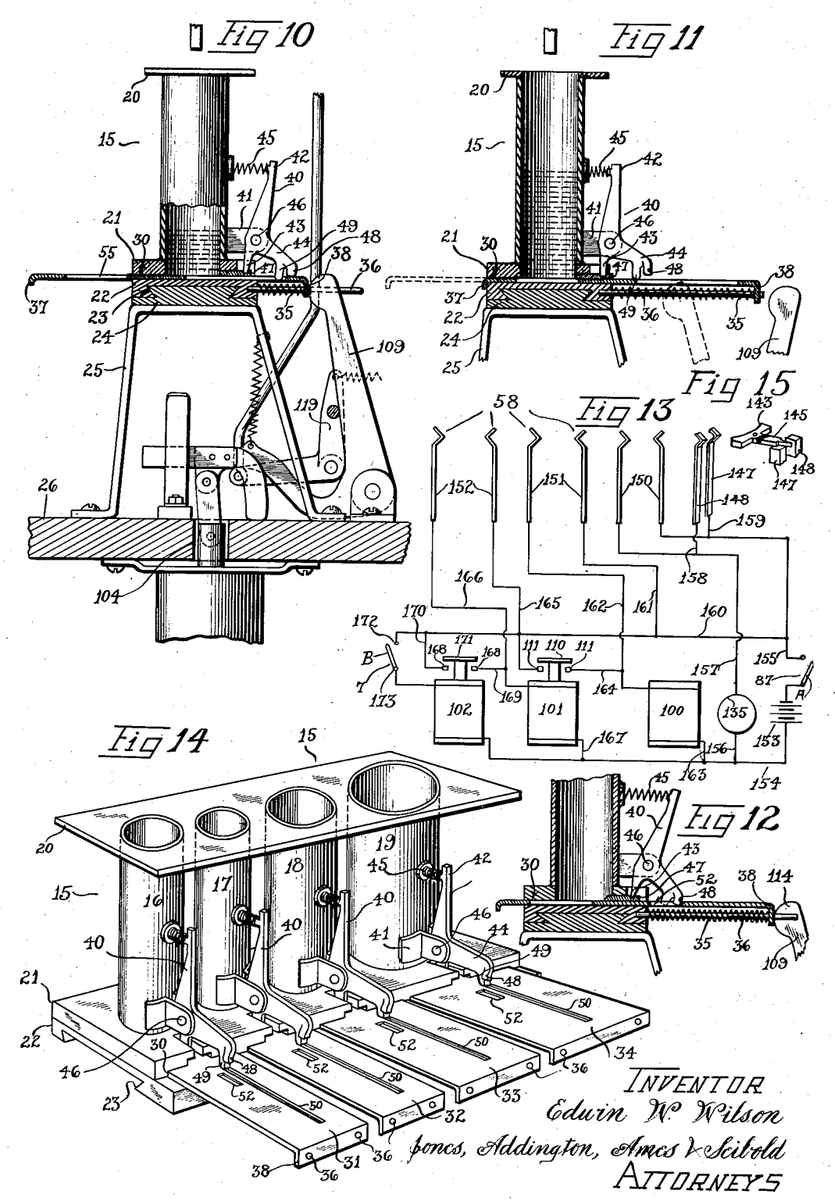
Fig. 10 is a detailed view, partly in section, illustrating the coin-ejecting mechanism in the position of ejecting a coin.
Fig. 11 is a similar detailed view of the same mechanism in its position when not ejecting a coin.
Fig. 12 is a similar view illustrating the manner in which this mechanism is locked against further operation when a coin chute is emptied.
Fig. 13 is a wiring diagram showing the circuit connections.
Fig. 14 is a perspective view of the removable coin chamber.
Fig. 15 is a detailed perspective view of the upper end of one of the coin chutes to illustrate the coin engaging contacts, which close the circuit operating the fare register and coin-ejecting mechanism.

Coin carrier 15 comprises a number of coin chambers 16, 17, 18 and 19 corresponding to coin slots 1 to 4, inclusive, for receiving nickels, dimes, quarters and half dollars. These chambers are arranged in spaced rigid relation by means of end plates 20 and 21. A base plate 22 for removably mounting coin carrier 15 in the machine is provided with a dovetail groove 23 for receiving dovetail 24 mounted on a raised supporting bracket 25, which is carried by floor 26 spaced from the bottom of the housing of the machine. Coin carrier 15 may be easily slid into position through door 11 and held by a disc 27 of a wing bolt 28. A flat edge 29 provided on disc 27 allows removal of coin carrier 15 when disc 27 is turned to clear the path of base plate 22.

Plate 21 is grooved at a plurality of points, say at 30, under each of the coin chambers, to receive reciprocable coin ejectors 31, 32, 33 and 34. Each coin ejector is normally held in non-operating position shown in Fig. 11 by springs 35 disposed about guide pins 36, projecting laterally from plate 22. Both ends of the coin ejectors are turned downwardly to provide flanges 37 and 38. The outer end of pins 36 ride in openings in flanges 38, so that, when the coin ejectors are actuated, the ejectors will move upon pins 36 to compress springs 35. After the coin is ejected, springs 35 serve to return the coin ejectors to their normal position of rest, the flanges 37 preventing the ejectors from riding off guide pins 36.

Coin ejector lock members 40 are pivoted upon brackets 41 secured to the outer wall of the coin chambers. Each lock member 40 is provided with three fingers 42, 43 and 44. Finger 42 cooperates with a spring 45, which urges the lock member 40 to rotate clockwise about its pivot 46. Finger 43 engages and moves a member 47 back and forth. Finger 44 is divided into two projections 48 and 49. Projection 49 rides normally in a slot 50 in each of the coin ejectors 31 to 34, inclusive. Projection 48 is offset slightly to lie in a different plane from that of projection 49. When any one of the coin chambers empties, it is desirable to lock the machine against further use. Consequently, plate 47 will be moved forwardly by the action of spring 45 to tilt the lock member a distance to bring projection 48 into engagement with a slot 52 provided in each of the coin ejectors. The coin ejectors are not only locked against movement, as illustrated in Fig. 12, but finger 42 of each coin lock is caused to engage a cross rod 53 (Fig. 5) carried by members 54 which operate the coin slot locking member, to be later explained. All coin slots 1 to 4, inclusive, are thereby locked against the further insertion of coins.

Each coin ejector is provided with an aperture 55 of a diameter equal to the denomination of coin its coin chamber receives. Inward movement of the coin ejectors causes coins from the chambers to be ejected outwardly, the coins dropping into cup 6 at the front of the machine. The parts of coin carrier 15 are ruggedly constructed and are not easily rendered inoperative by handling. Consequently coin carrier 15 will not become easily out of order by the operator handling it when removed from the machine. By making this mechanism as a self-contained subassembly, it may be easily removed from the machine at night by the operator, say the driver of a bus, if the machine is used on a motor bus, to enable him to count his money or to retain the mechanism in his possession until he resumes operation of the bus. The mechanism is preferably arranged to be of universal construction so that it will easily fit any machine, although other operating parts may be changed. The only essential requirement is that the dovetail 24 and its groove 23 be made of standard dimensions.

Coin receiving mechanism

Slots 1 to 4, inclusive, receiving the coins, continue downwardly in the machine in the form of coin chutes 56. The front of chutes 56 is open, as at 57, so that the coins will be visible to the driver when passing window 5. A pair of spring contacts, designated generally as 58, are provided for each chute, these contacts being arranged with V-shaped ends, which lie in cut-away portions 59, in opposite sides of the chutes so that the inserted coin will engage the same to close the circuit of the fare registering coin ejecting mechanism. The back wall 60 of each chute is apertured at 61 to allow a spring finger 62 to project into the chute, one purpose of which is to deflect coins of improper denominations, which have been deposited in any of the slots, through openings 57, and drop upon floor 70 and roll forwardly through opening 71 into cup 6.

While I have incorporated means preventing the withdrawal of the coin at the mouth of the chute, which I shall presently explain, spring fingers 62 also prevent any attempt to bring the coin into contact with the contacts 58 after the coin has moved past these contacts to actuate the fare registering and coin ejecting mechanism. The protection afforded by this arrangement assures the operator that no one may tamper with the machine to the end of allowing an inserted coin to actuate the fare registering and coin ejecting mechanism more than once.

Figures 5, 6, 7, 8:
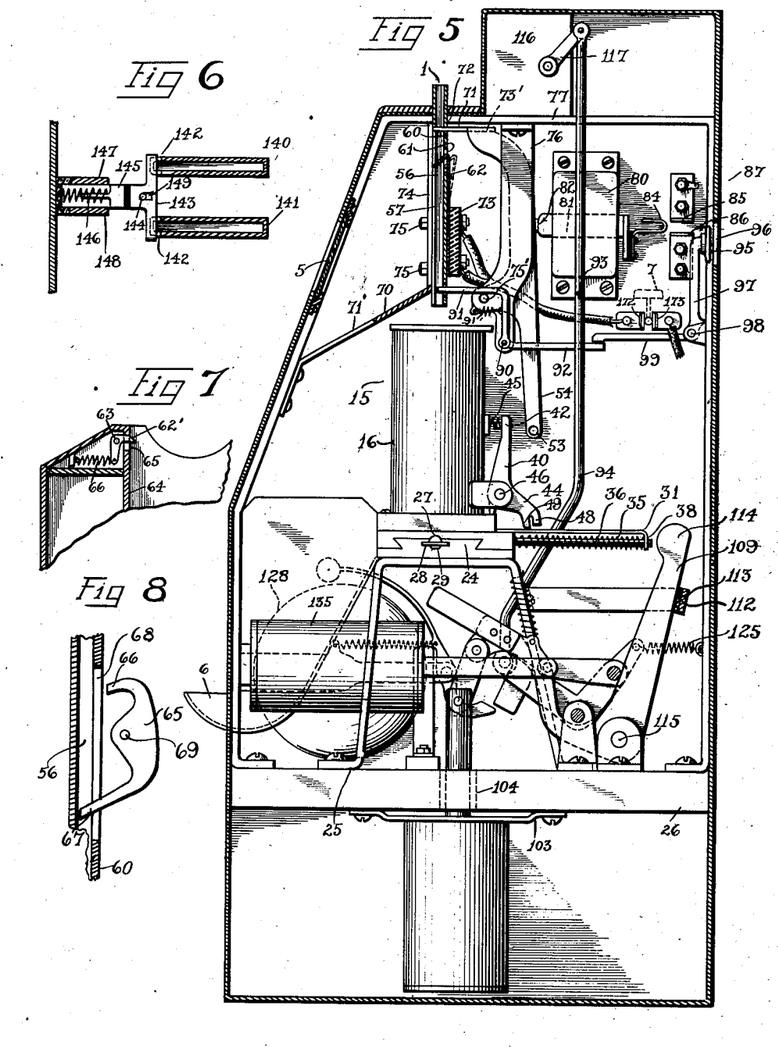
Fig. 5 is a vertical sectional view taken on line 5—5 of Fig. 4 and looking in the direction of the arrows, one of the coin chutes being shown in section.
Fig. 6 is a detailed sectional view of the mechanism requiring simultaneous insertion of two five cent pieces to complete the circuit for registering one fare.
Fig. 7 is a detailed sectional view illustrating one of the pivotally mounted fingers located adjacent the mouth of the coin slots preventing withdrawal of coins after deposited a distance sufficient to operate the fare register and coin ejecting mechanism.
Fig. 8 is a detailed view illustrating a modified form of device accomplishing the same result.
Figure 9:
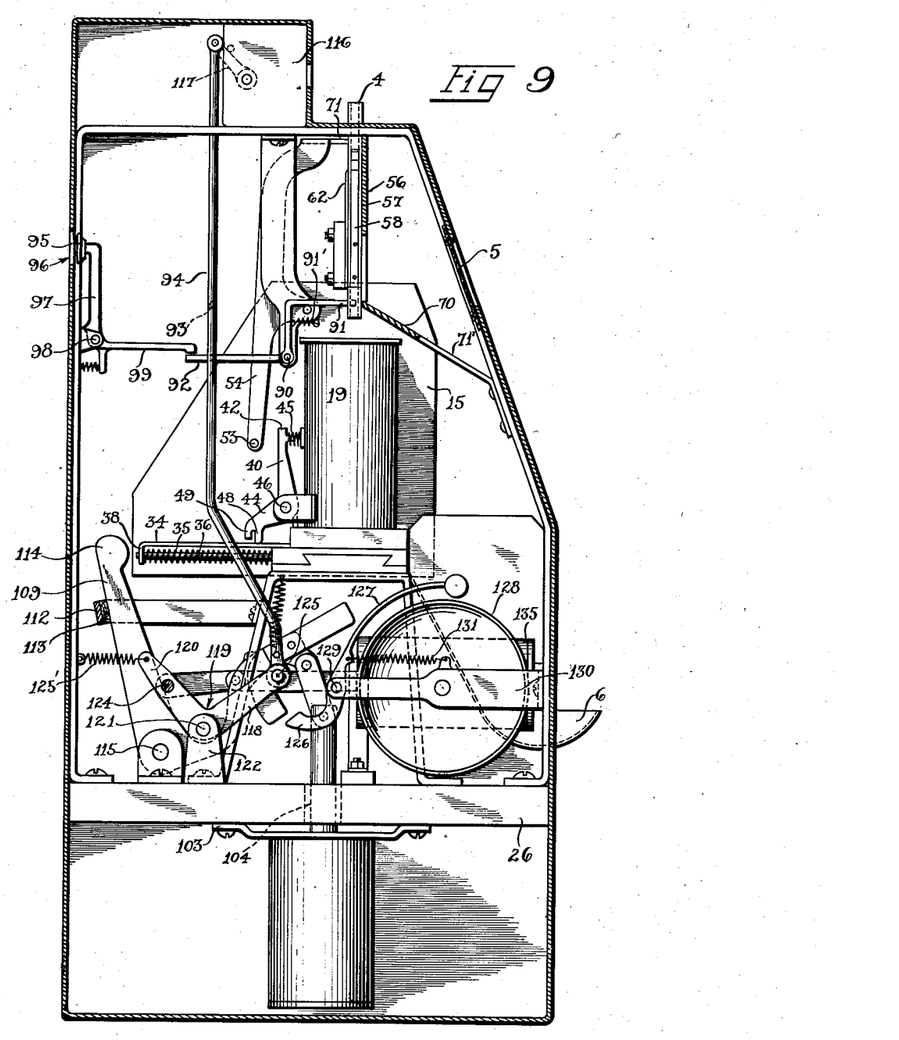
Fig. 9 is a view similar to Fig. 5 but taken on line 9—9 of Fig. 4.

In Fig. 7 I have illustrated one or two opposed dogs 62' pivoted at 63, at or adjacent to the mouth of slots 1 to 4, inclusive. Wall 64 of these slots have an aperture therein to allow the pointed end of these dogs to project therethrough and into the chutes a short distance. Pivotal mounting 63 allows dogs 62 to move downwardly on the insertion of a coin while springs 66 are provided to return the dogs to their normal position, it being impossible for these dogs to move in opposite direction so as to allow removal of the coins. Pointed ends 62' act as gripping means so that they will engage the periphery of the coin and restrain the outward movement of the coins.

As an alternative arrangement, I contemplate providing, as shown in Fig. 8, double-acting pivoted dogs 65 having opposed legs 66 and 67 extending in a slot 68 in the rear wall 60 of each chute. Pivotal mounting 69 causes these dogs 65 normally to swing in a position withdrawing leg 66 from slot 68 and projecting leg 67 into this slot. A deposited coin engages leg 67. This engagement will, in return, swing leg 67 out of slot 68 and bring legs 66 into this slot, thereby preventing any attempt to remove the inserted coin after it has passed contacts 58.

Chutes 56 are supported by an insulated cross member 73 and a partition member 74, the latter partition member 74 being preferably a vertical extension of floor 70. Bolts 75 may be employed to clamp the chutes between cross members 73 and partition 74. Insulation cross member 73 acts as a terminal block for the wiring connections leading to contacts 58 (see Fig. 4). Each contact 58 extends downwardly along a side of the chute so that its laterally extending lip 75 may pass through a slot 76 in cross member 73 to receive the circuit wire.

Coin chute locking mechanism

Mechanism is provided to prevent the insertion of a coin for any of slots 1 to 4, inclusive, if any one of the corresponding coin chambers 16 to 19, inclusive, is emptied, or the operator is compelled to leave the machine for a short time. In the latter event, it is not desirable to allow customers to insert coins in the machine in the absence of the operator due to the possible attempt to deposit spurious coins at these times or to allege that a coin of larger denomination has been actually inserted and the machine failed to dispense sufficient change. This mechanism is preferably in the form of laterally movable pins 71 adapted to project into the coin chutes through slots 72 in their rear walls 60. Pins 71 are mounted upon a cross bar 73' of a frame 74 pivotally mounted on opposite sides at 75' on downwardly projecting rigid frame members 76 which are fastened to part 77. Side members 54 of frame 74 project downwardly beyond the pivotal points 75' to carry the cross rod 53, which is adapted to be engaged by coin ejector lock members 40 when any one of the coin chambers 16 to 19, inclusive, is emptied to tilt pins 71 forwardly into the chutes.

A key-operated lock 80 actuated by key 8 mentioned in connection with the description of the exterior of the machine, controls the movement of a lock bolt 81, one end 82 of which engages a projection 83 on one of the side members 54 of frame 74 to tilt pins 71 forwardly into the chutes to prevent insertion of coins, while the other end of which bolt carries a switch contact 84 adapted to break the bridging engagement between contacts 85 and 86 of switch 87. Thus it will be seen that operation of lock 80 prevents insertion of coins in the machine and simultaneously opens the circuit of the fare-registering and coin-ejecting mechanism.

Coin release mechanism

This mechanism releases each coin after it has been inserted in its corresponding slot and dropped through the chute to actuate the fare registering and coin ejecting mechanism upon deposit of another coin. It is not desirable to allow more than one coin to be visible at window 5 due to the possibility of dispute with a customer as to which coin he deposited in the event the machine should accidentally deposit the wrong amount of change. This dispute is apt to arise, although the machine may dispense correct change if unscrupulous persons should note the opportunity to allege having deposited a larger denomination of coin merely because such larger denomination of coin appears at window. Cross rod 90 is secured to the lower extremities of the frame members 76. A releasing finger 91 is provided for each chute on cross rod 90, preferably in rigid relation, so that rotational movement of cross rod 90 will tilt all these fingers into and out of the chutes. A lateral projection 92 is preferably provided at the extreme right hand end of cross rod 90, to be engaged by a pin 93 carried on the register rod 94 of the fare registering mechanism, so that, each time the registering mechanism is actuated, pin 93 will engage extension 92 to withdraw all pins 91 out of the chutes, thereby allowing any coin in the chutes to drop into its proper coin chamber. As a coin is deposited, it will engage opposed contacts 58 of the chute through which the coin moves, to close the circuit controlling the fare-registering and coin-ejecting mechanism. Each operation of the fare registering mechanism clears the chutes of the previously deposited coin and the pins 91 return in time, by means of springs 91', to restrain continued movement of the deposited coin through the chutes into its proper coin chamber so that this deposited coin will remain in front of window 5 until another coin is deposited.

When a machine of the type herein disclosed is used on motor buses, it is desirable for the operator of the bus or vehicle to remove his coin chamber and also to clear his machine of the last deposited coin remaining in back of window 5, because this operator will be required to account for all fares that have been recorded by the registering mechanism. I provide, therefore, manual means for clearing the machine, which comprises a button 95 disposed in the machine but in close proximity to an opening 96 in the rear wall of the housing. Button 95 is carried on a bell crank member 97 pivoted at 98 (see Fig. 5), this member 97 having one of its fingers 99 projecting inwardly to engage extension 92 carried by rod 90. Manually pressing button 95 will tilt leg 99 downwardly to trip extension 92, whereby to withdraw fingers 91 momentarily to allow any coin in any of the chutes to drop into its proper chamber.

Fare registering and coin ejecting mechanism

The principal operating features of the invention may be incorporated in a machine mechanically operated throughout by the deposit of a coin in its proper form. I preferably provide, however, electrically operated means in the form of a plurality of solenoids connected in circuit with contacts 58 for actuating the fare registering and coin ejecting mechanism. Solenoids 100, 101 and 102 may be supported by brackets 103 to the underside of floor 26, the cores of these solenoids projecting through openings 104 in floor 26.

Figure 16:
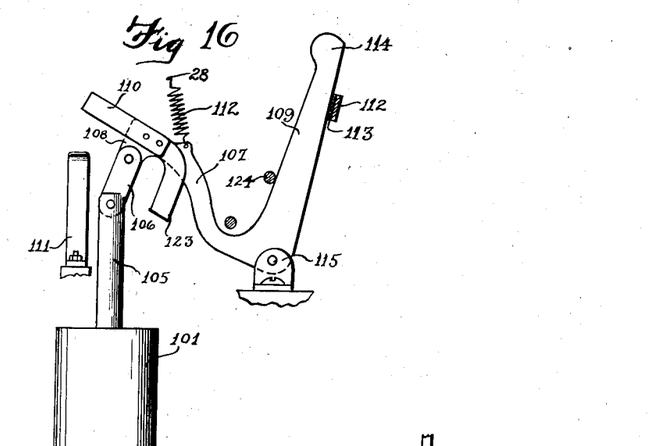
Fig. 16 is a detailed view of the solenoid actuated mechanism for operating the coin-ejecting fingers of the twenty-five and fifty-cent coin chutes.

By referring more particularly to Fig. 16, it will be noted that core 105 of solenoid 101 connects at its upper end to a link 106. Link 106 connects to arm 107 at lug 108 of a coin ejector finger 109. A switch blade 110 is also connected to arm 107 at 108, which switch blade has a stop 123 attached thereto. Switch blade 110 may be attached at 108 in insulated relation to the connecting parts.

A pair of contacts 111 is adapted to be engaged by a switch blade 110 upon actuation of solenoid 101. Closing the circuit at contacts 111 energizes solenoid 100, the purpose of which will be later explained. Stop 123 is adapted to engage the floor 26 to limit the downward movement of switch blade 110.

A spring 112 connected at its fixed end to frame 25 tends normally to keep switch blade 110 out of engagement with contacts 111, thereby also tilting coin ejector finger 109 backwardly against a rest bar 112, having a cushioning strip 113 carried thereby for the coin ejector finger 109 to strike against. A head 114 is provided on each coin ejector finger 109 to engage flange 38 of the coin ejectors 31 to 34, inclusive. When either of the solenoids mentioned is actuated by the depositing of a coin in the proper chute to engage contacts 58, the corresponding coin ejector finger will pivot counterclockwise at 115 to bring its head 114 forwardly against the proper coin ejector, whereby to eject a coin from the coin chamber with which it is associated.

As heretofore mentioned, the basis of a fare is the value of ten cents, but this may be varied, if so desired. Depositing two nickels or a dime will cause registration of a fare without making change. Depositing a quarter or a half dollar will cause registration of a fare and the making of change. Fare registering mechanism 116 is operated by means of a link 117 attached to vertical arm 94, the lower end of this arm being secured to arm 118 of bell crank lever 119 pivotally carried at 121 upon bracket 122 secured to floor 26. The other arm 120 of this bell crank lever 119 receives a transverse rod 124 extending crosswise of the machine. Spring 125' is secured to the free end of arm 120 to maintain the bell crank lever 119 tilted in the position shown in Fig. 18. When in this position arm 120 brings rod 124 against the inner edge of each coin ejector finger 109, as shown in Fig. 16. Consequently, bell crank lever 119 will be tilted counterclockwise to pull downwardly on rod 94 when either of the solenoids 100, 101 or 102 is energized to actuate its coin ejector finger 109.

A pin 125 extends laterally from the connection between rod 94 and arm 118 of bell crank lever 119 for the purpose of engaging the lower end 126 of striker arm 127 of bell 128. Striker arm 127 is pivoted at 129 to a bracket 130 attached in any suitable way to the stationary portion of the housing of the machine. A spring 131 normally tends to pull striker arm 127 against the bell so that each time pin 125 strikes projection 126, striker arm 127 will tap the bell to give an audible signal indicating that the fare registering system has been actuated.

When two nickels or a dime is deposited, no change is dispensed. Therefore, I provide a solenoid 135 suitably disposed, say above floor 26, having its core 136 connecting to a link 137 attached to cross rod 124. Energizing solenoid 135 will merely operate the fare registering mechanism 116 and signalling mechanism 128.

Circuit connections

Coin slot 1 is designed to receive two nickels concurrently in order to complete the circuit. I purposely arrange the contact member controlling this circuit to prevent insertion of one nickel at a time. This is accomplished by dividing slot 1 into two compartment members 140 and 141 each having one of the side walls cut away at 142 to allow a swivelly mounted bar 143 pivoted at 144 to project slightly into the passages of these compartments. A contact 145 is carried in insulated relation on bar 143. A spring 146 tends to keep bar 143 and its contact 145 centered with respect to its pivot point 144. Contacts 147 and 148 are arranged in spaced relation with respect to contact 145 so that when bar 143 is displaced equally out of the passages of the compartments 140 and 141, the contact 145 will bridge the contacts 147 and 148 to close the circuit. It will be noted that the elongated slot 149 in which pin 144 is disposed allows bar 143 to move backwardly on pin 144, but should only one nickel be deposited in either of the chambers 140 or 141, bar 143 will tilt edgewise and jam the passage of the particular compartment and also fail to bridge both of said contacts 147 and 148. As soon as a second nickel is deposited in the other chamber, bar 143 will immediately straighten itself with respect to its pivot point 144 and move equally backward on opposite sides of its pivot to move contact 145 in bridging relation with cooperating contacts 147 and 148.

By referring to the wiring diagram shown in Fig. 13, it will be noted that I have provided a pair of contacts 150 for slot 2 adapted to receive a dime. Contacts 151 are provided for slot 3 receiving a quarter. Contacts 152 are provided for slot 4 receiving a half dollar. I have given these contacts separate reference characters, although I have previously designated them generally as contacts 58.

A source of current designated broadly as 153 is connected in circuit by a wire 154 at one side and by a wire 155 at the other side. Connected to wire 154 is a wire 156, solenoid 135, a wire 157, connecting to one of the contacts 150. The opposite contact 150 is connected to wire 155. A wire 158 connects contact 148 with wire 157 and a wire 159 connects contact 147 with wire 155. A wire 161 connects to wire 160 which in turn connects to wire 155. The opposite contact 151 is connected to solenoid 100 by wire 162. The opposite end of the winding of solenoid 100 is connected to wire 154 by a wire 163. One of the contacts 111 of solenoid 101 is connected to wire 162 by a wire 164. The other contact 111 is connected to one of the contacts 152 and wire 160 by a wire 165. The other contact 152 is connected by wire 166 to one end of the winding of solenoid 101, the opposite end of which winding is connected by a wire 167 to wire 154. Contact 168 of solenoid 102 is connected to wire 166 by a wire 169. The opposite contact 168 is connected by a wire 170 to wire 160.

Contact 171, which is the equivalent of contact 110 of solenoid 101, is adapted to bridge contacts 168 upon energization of solenoid 102.

Figure 2:
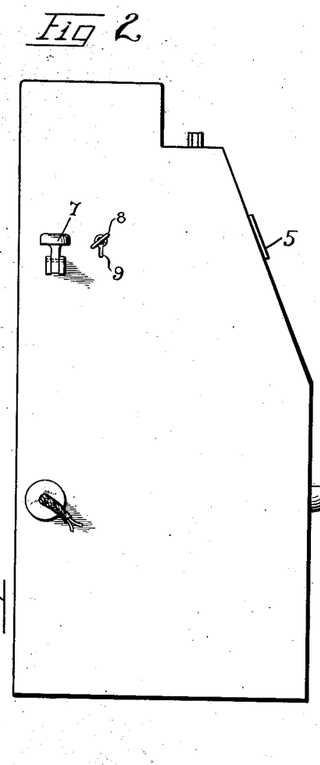
Fig. 2 is an elevation of the left-hand side of the machine showing the key lock and manually operated button for making change of one dollar.
Figure 3:
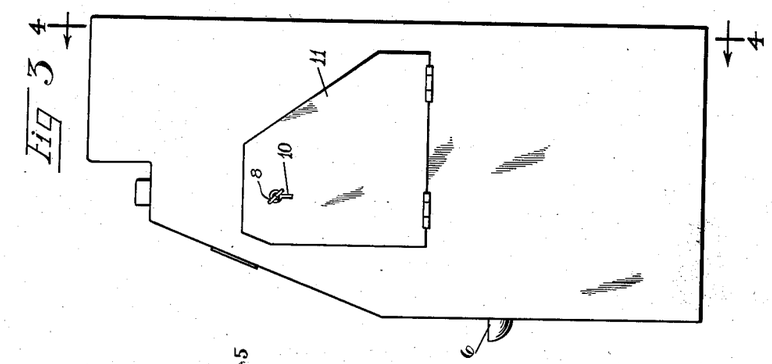
Fig. 3 is an elevation of the right-hand side of the machine illustrating the door through which the coin carrier is inserted.

Button 7, heretofore referred to as being manually operated to register a fare and make change for one dollar, controls contacts 172 and 173 and may be suitably located anywhere on the machine as illustrated in Fig. 2.

By again referring to Fig. 13, it will be understood that depositing two nickels or one dime will energize solenoid 135 to actuate fare registering mechanism 116 and signalling mechanism 128. No change is made by the depositing of these two denominations of coins. Depositing a quarter will close the circuit at contacts 151 to energize solenoid 100, which actuates one of the coin ejector fingers 109 to dispense a nickel and a dime and register a fare.

Figure 4:
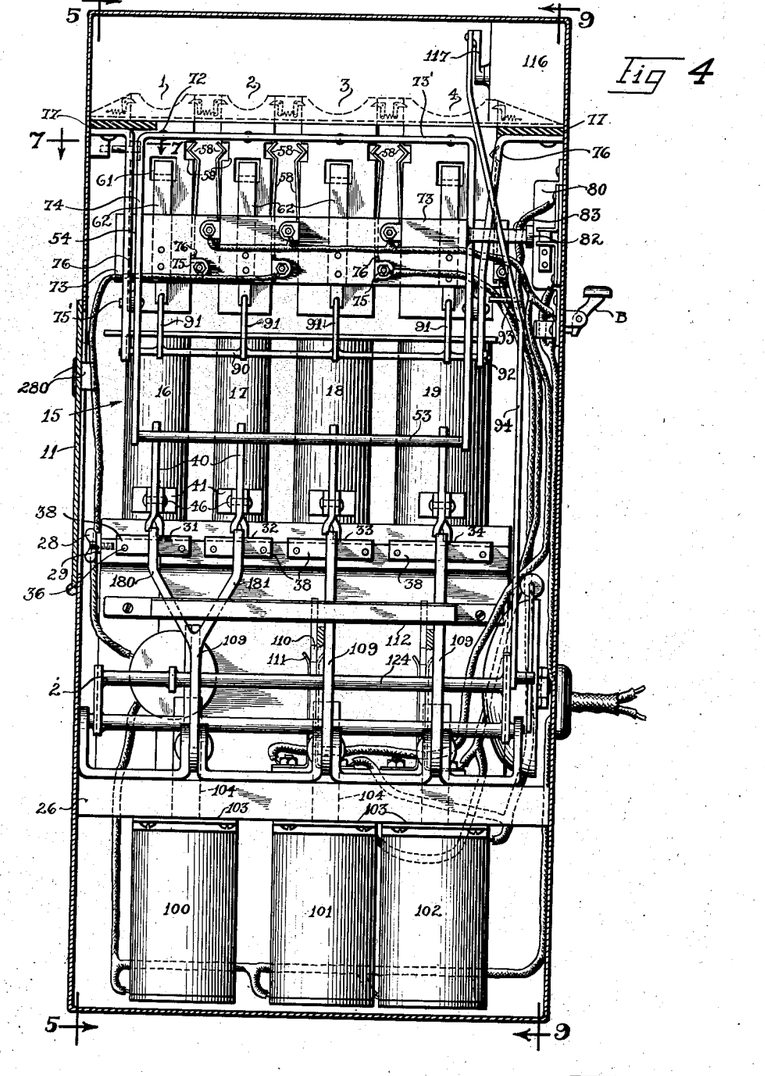
Fig. 4 is a vertical sectional view taken substantially on line 4—4 of Fig. 3, looking in the direction of the arrows.

Referring now to Fig. 4, it will be noted that the particular coin ejector finger 109 of solenoid 100 employed to eject a nickel and a dime is preferably bifurcated at its upper end to provide separate fingers 180 and 181, the finger 180 operating coin ejector 31 to eject a nickel, the finger 181 operating coin ejector 32 to eject a dime.

As previously explained, the core 105 of solenoid 101 is provided with a contact 110, which is adapted to engage contacts 111 to close the circuit comprising wires 160 and 164 for the purpose of also energizing solenoid 100. Energizing solenoid 101 operates the corresponding coin ejector finger 109 engaging coin ejector 33 to eject a quarter. Energizing solenoid 100 operates the fingers 180 and 181 to actuate coin ejectors 31 and 32, respectively, to eject a nickel and a dime. Consequently, it will be noted that depositing a half dollar registers a fare by operating fare registering mechanism 116, actuates signaling mechanism 128, and ejects a nickel, a dime and a quarter, or a total of forty cents.

No means is provided to deposit a silver dollar or paper money, but the operator may receive the same from the customer or passenger and manually operate button 7, which closes the circuit at contacts 172 and 173 to energize solenoid 102, which in turn energizes solenoid 101 by drawing contact 171 into engagement with contacts 168. In turn, energizing solenoids 101 energizes solenoid 100 in the manner previously explained so that the fare registering mechanism 116 is actuated to register a fare, the signalling mechanism 128 is actuated to indicate the operation of registering mechanism 116, and a half dollar, a quarter, a dime and a nickel, or a total of ninety cents, is dispensed. By dispensed it is meant that the coins are dropped into cups 6 to be taken by the customer or passenger.

Operation

The movement of a coin through the machine illustrated in Figs. 1 to 18, inclusive, will now be described. Assuming that two nickels are deposited in slot 1, which is in reality the two companion compartments 140 and 141. If these nickels are deposited simultaneously, bar 143 will move backwardly to bring its contact 145 into bridging relation with contacts 147 and 148 to energize solenoid 135.

Figure 17:
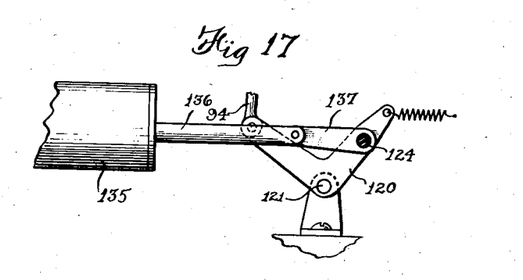
Fig. 17 illustrates the solenoid operated mechanism for actuating the fare register and audible signal when either two nickels or a dime is deposited.
Figure 18:
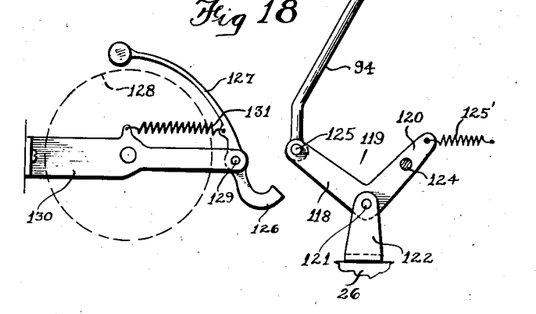
Fig. 18 illustrates the mechanism operated by the solenoid actuated mechanism shown in Fig. 16 to operate the audible signal and fare register.

By referring to Fig. 17, it will be noted that energizing solenoid 135 will cause its core 136 to pivot lever 120 about point 121 and thereby pull register bar 94 downwardly to operate fare register 116. The movement of register bar 94 and the operation of fare register 116 are so timed that pin 93 on register bar 94 will engage projection 92 of the coin releasing mechanism to pivot rod 90 whereby to withdraw all fingers 91 from the coin chutes 56. The previously deposited coin is accordingly released for movement into its proper coin chamber. Inasmuch as the machine is to operate upon the basis of a ten cent fare, no change will be dispensed. Solenoid 135 will also be energized to operate register bar 94 and the fare register mechanism 116 in like manner when a dime is deposited in slot 2 to close circuit at contacts 150. Coin releasing fingers 91 will also be operated to permit the previous coin deposited in the machine to pass into its chamber of the coin carrier 15. If this previously deposited coin happens to be the two nickels just described, withdrawal of fingers 91 from the nickel chute will cause these two nickels to pass into coin chamber 16 of the coin carrier 15.

If a twenty-five cent piece is deposited in slot 3 the change making mechanism will function to dispense change because the circuit will be closed at contacts 151 to energize coil 100. Coin ejector fingers 180 and 181 will be operated to engage coin ejectors 31 and 32 to eject a nickel and a dime from coin chambers 16 and 17. Fare registering mechanism 116 will operate when ejector fingers 180 and 181 engage cross rod 124 to swing lever 119 to the left whereby to pull register bar 94 downwardly to register a fare. Pin 125 will strike projection 126 to cause striker 127 to engage the bell 128 and give an audible signal when a fare is registered.

Depositing fifty cents in slot 4 will close the circuit across contacts 152 to energize solenoids 101 and 100, to dispense a quarter, a dime and a nickel. It not infrequently happens that a passenger may not have less than a dollar to offer to the driver. To register a fare and make change for a dollar, switch button 7 is manually operated to energize solenoids 102, 101 and 100, and thereby to dispense a half dollar, a quarter, a dime and a nickel, and also to operate fare registering mechanism 116 and signalling mechanism 128 which registers a fare and indicates the same by an audible signal.

Also, it not infrequently happens that a passenger may inadvertently deposit a coin in the wrong slot. In this event, the coin will drop through the chute without closing the contacts, designated generally as 58, and fall forwardly through the open front designated 56 into the sloping plate 70 and through opening 71' into cup 6 clearly illustrated in Fig. 5. It will be noted that by the use of the key operated lock 80, fingers 71 may be permanently projected into coin chutes 56 to prevent insertion of coins, and, at the same time, the electrical connections may be broken to prevent tampering with the machine. This mechanism has been found to be useful in cases where the machine is used as a fare registering and collecting device on buses and the bus driver is required to leave his post temporarily.

In the event any of the coin chambers 16 to 19, inclusive, should become empty due to dispensing more coins therefrom than should be deposited at the coin slot, the particular coin ejector lock member 40 will function to lock its coin ejector against movement and at the same time to engage cross rod 53 to swing members 54 of frame 74 about their pivot. Fingers 71 of the coin chute locking mechanism will thereby be projected into the coin chutes 56. Assuming now for purposes of illustration that the quarter chamber 18 is empty and a half dollar is deposited in slot 4, or the dollar button 7 is operated to dispense change for a dollar. Energizing solenoid 101 will actuate the coin ejector finger 109 of this particular unit of the coin carrier 15 to move coin ejector 33 inwardly to eject a quarter. There being no quarters in chamber 18, projection 48 of lock member 40 will automatically drop into slot 52 in coin ejector 33, because the absence of the last quarter in chamber 18 will allow plate 47 to be moved inwardly slightly by the action of spring 45 upon the coin ejector lock member 40. Spring 45 normally urges these lock members 40 to tilt about their pivot, but the presence of coin in the chambers prevents the plates 47 from moving inwardly. Consequently, the projections 48 cannot engage in slots 52 in the coin ejectors to lock them against movement. However, as soon as the last coin is dispensed from any coin chamber, this plate 47 of that unit of the coin carrier 15 is free to move inwardly by the action of its spring 45 to allow the lock member 40 to lock the coin ejector against operation and to project pins 71 into the coin chutes 56 to prevent further insertion of coins.

Refilling of the coin chambers 16 to 19, inclusive, is easily accomplished. By providing a single key 8 to the operator or driver of the bus, the circuit must first be opened at 87 and the coin chutes 56 locked against insertion of coins by the projection of pins 71 into the chutes, before the door 11 may be unlocked and opened to remove the coin carrier 15. Such construction prevents insertion of coins whenever coin carrier 15 is removed. Locking the chutes 56 against the insertion of coins when the key is operated to break the circuit at 87 also novelly permits the machine to be locked against insertion of coins when the machine is not in use. Consequently, no one is permitted ruthlessly to operate the fare mechanism, merely to increase the readings so as to cause the operator of the machine embarrassment.

*Slug machine*

By adding another coin chamber to the carrier for reception of slugs and by slightly revising the coin ejector or change making mechanism of the nickel and dime coin chambers, it is possible to use the present machine for dispensing telephone slugs and for making the proper change. Also, it is possible to redeposit the slug and receive a nickel therefor.

Coin slots 200 to 204, inclusive, are provided for receiving a slug, a nickel, a dime, a quarter and a half dollar, respectively. The coin chutes, into which these slots feed the coins, are substantially the same as heretofore described and to avoid repetition no description thereof will be given. It will be noted, also, that all parts associated with the coin chutes are also substantially the same as previously described.

Coin carrier 15 comprises in this embodiment a slug chamber 205, a nickel chamber 206, a dime chamber 207, a quarter chamber 208 and a half dollar chamber 209. These chambers are likewise held in spaced rigid relation by plates 210 and 211. A base plate 212, similar to that heretofore described and having a dovetail groove therein, is secured to plate 211 to removably fit upon a dovetail plate 213 rigidly secured to a bracket 214. Coin ejectors 215 and coin ejector lock members 216 are also substantially of the same design as previously described.

Figure 22:
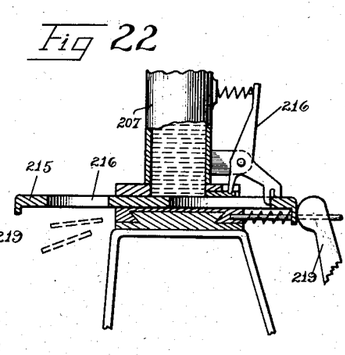
Fig. 22 is a detailed view illustrating the coin ejecting mechanism dispensing two dimes as change when a quarter is deposited to purchase a slug.

However, coin ejector 215 of the dime coin chamber 207, as shown in Fig. 22, is provided substantially thicker so that its slot 216 is of twice the thickness of a dime to permit two dimes to drop thereinto from chamber 207, whereby actuation of coin ejector 215 will eject two dimes.

In this particular embodiment, depositing a quarter will eject a slug and two dimes. Depositing a half dollar will eject a quarter, two dimes and a slug. The only time a nickel is ejected is when a dime is deposited, which dispenses a slug and a nickel, or when a slug is redeposited in slot 200. In order to allow for redepositing the slug in the machine and returning a nickel without destroying the reading of the register of the number of slugs sold, a second register or recorder 218' is provided to indicate the number of slugs returned to the machine. Registering mechanism 217 is provided to operate each time a slug is dispensed and a five cent value is deducted from the coin deposited and the change returned if the coin deposited is of greater value than five cents. Registering mechanism 218' operates each time a slug is redeposited in slot 200 to receive a nickel in return. It will therefore be obvious that the difference between the readings of registering mechanism 217 and registering mechanism 218' will determine the number of slugs sold and the amount of coin which should be in the machine.

The above result is accomplished by providing two coin ejector fingers 218 and 219 for nickel coin ejector 215. Coin ejector finger 218 is of different design than coin ejector finger 219. It is pivoted at 220, the same as finger 219, but is curved at 221 to avoid engaging transverse rod 222 operating the vertical register bar 224 when engaged by any of the coin ejecting fingers 219 each time five cents is subtracted from the coin deposited in the machine.

Figure 21:
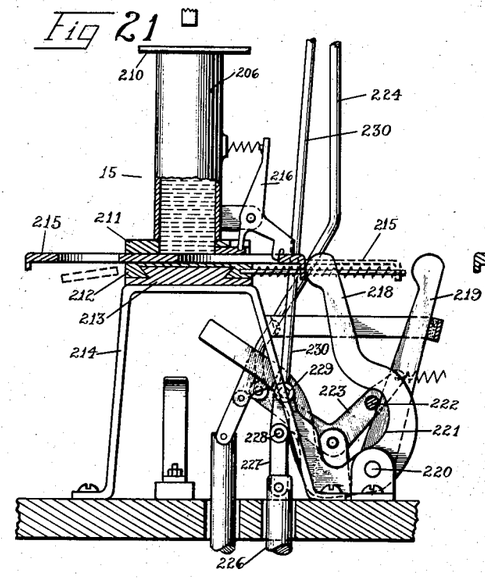
Fig. 21 is a view of this modified form of machine corresponding to Fig. 10.

Solenoids are provided to actuate the coin ejector finger 218 and fingers 219. By referring to Fig. 21, it will be noted that a solenoid 225 is arranged to have its core 226 connect to coin ejector finger 218 of the nickel coin ejector by means of a lever 227 pivoted at 228. This coin ejector finger 218 is connected at 229 to a register bar 230 connecting with registering mechanism 218'.

Figure 19:
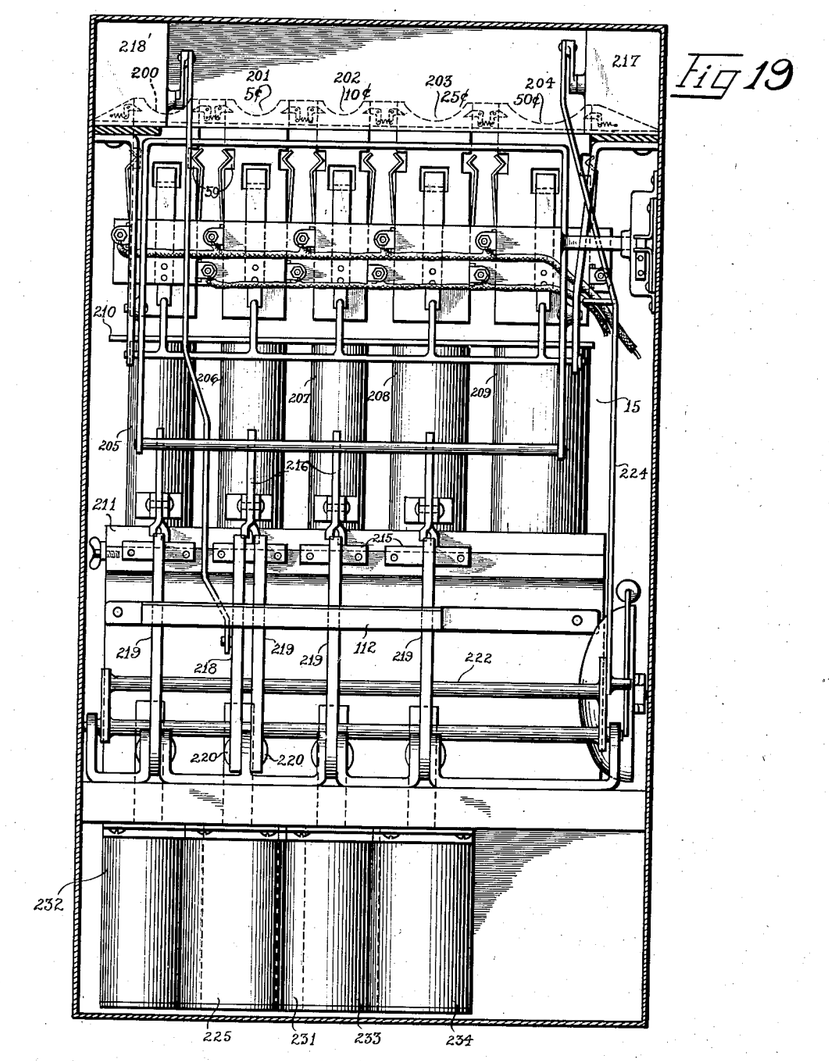
Fig. 19 is a view corresponding to that shown in Fig. 4 of a machine incorporating the present invention which is adapted to receive coins to dispense telephone slugs and make change in the event the deposited coin is of greater value than the value of the slug, and also to receive the slug and return the nickel if the slug is redeposited in the machine.
Figure 20:
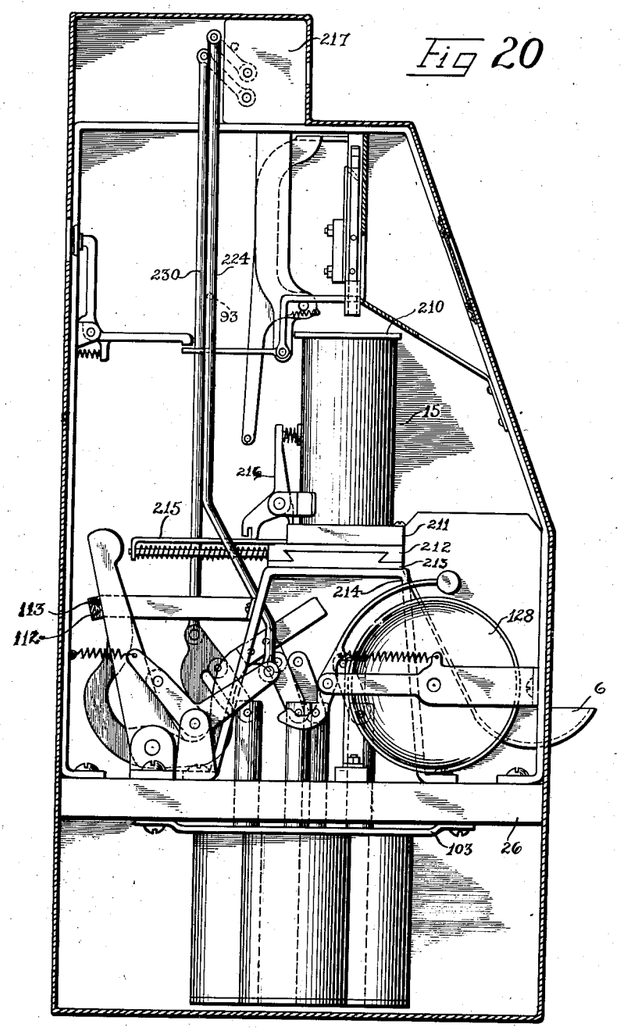
Fig. 20 is a view similar to Fig. 9 of the modified form of machine.

It will be apparent that each time coin ejector finger 218 operates coin ejector 215 to dispense a nickel from coin chamber 206, it will pull downwardly on register bar 230 to operate registering mechanism 218'. In the event a dime is deposited in slot 202, a solenoid 231 is energized (see Fig. 23) to operate coin ejector finger 219, shown in Fig. 21, which engages coin ejector 215 instead of finger 218. Actuation of coin ejector finger 219 operates rod 222, which, through pivoted lever 223 operates register bar 224 to actuate registering mechanism 217 instead of registering mechanism 218'. Irrespective of which finger engages the coin ejector 215, a nickel is dispensed, but the dispensing of a nickel through the movement of finger 218 operates registering mechanism 218', while operation of finger 219 actuates registering mechanism 217. Coin ejector finger 219, shown in Fig. 19, for ejecting slugs from the slug chamber 205, is operated by its solenoid 232. Coin ejector finger 219 for operating the coin ejector 215 of the dime chamber 207 is operated by solenoid 233. As previously explained, movement of the dime coin ejector finger 219 ejects two dimes at a time from coin chute 207. A solenoid 234 is provided to operate the quarter coin ejector finger 219 for actuating the coin ejector 215 of the quarter chute 208. No coin ejector finger 219 is provided for the half dollar chute because it is preferable not to provide for making change of coins of larger denominations in a machine used for ejecting slugs. It is, of course, not desirable to provide the manually operable button 7 for ejecting change for one dollar because coin slug machines are not always guarded by an attendant but are sometimes left to be used by the public unguarded.

Figure 23:
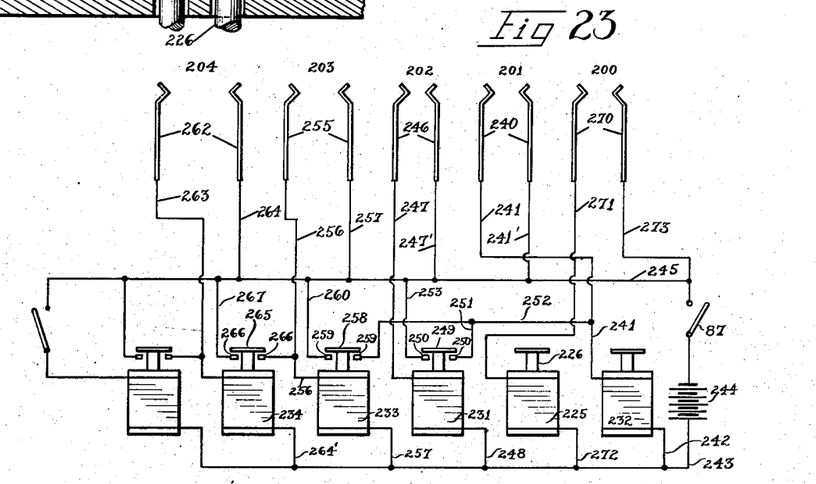
Fig. 23 is a wiring diagram showing the circuit connections.

By referring to Fig. 23, it will be noted that when a nickel is deposited in chute 201 the current will flow from one of the contacts 240 through wire 241 to energize solenoid 232 through wire 242, wire 243, the source of current supply 244, key-operated lock switch 87, wire 245, wire 241' to the other contact 240. Energizing solenoid 232 will actuate its coin ejector finger 219 and coin ejector 215 to dispense a slug from coin chamber 205.

If a dime is deposited in slot 202, the current will flow from one of contacts 246 through wire 247, solenoid 231, wire 248, wire 243, source of current supply 244, key-operated lock switch 87, by way of wires 245 and 247' to the opposite contact 246. Energizing solenoid 231 will cause switch blade 249 corresponding to the previously described switch blades 110 and 171, to engage contacts 250 whereby the current will flow through wire 251, wire 252, wire 241 to energize solenoid 232, wires 242 and 243, source of current supply, key-operated lock switch 87, and return by way of wire 245 to wire 253. Energizing solenoid 231 will cause the operation of its coin ejector finger 219 and coin ejector 215 to dispense a nickel from the nickel coin chamber 206. The simultaneous energization of solenoid 232 operates in the manner just explained to eject a slug from the slug chamber 205.

When a quarter is deposited in slot 203, current will flow from one of the contacts 255 through wire 256, to energize solenoid 233, wire 257, wire 243, source of current supply 244, key-operated lock switch 87, and return by way of wires 245 and 257 to the opposite contact 255. Energizing solenoid 233 will cause switch blade 258 to engage contacts 259 for the purpose of establishing of current flow by way of wire 252, wire 241, to energize solenoid 232, wires 242 and 243, source of current supply 244, switch 87, wire 245, and return by wire 260. Two ten cent pieces will be dispensed when solenoid 233 is energized, and a slug will be dispensed when solenoid 232 is energized.

If a fifty cent piece is deposited, the current will flow from one of contacts 262 through wire 263, through solenoid 234 to energize it, wires 264 and 243, source of current supply 244, key-operated lock switch 87, wire 245, wire 264, to the opposite contact 262. Energizing solenoid 234 causes switch blade 265 to engage contacts 266, whereupon current will flow through wire 256, through solenoid 233 to energize it, wires 257 and 243, source of current supply 244, switch 87, wire 245, and wire 267. When solenoid 233 is energized, the current will further flow through the circuit controlling the slug ejecting solenoid 232. Thus, when fifty cents is deposited, three solenoids operate, the solenoid 232 operating to eject the slug, the solenoid 233 operating to eject two dimes, and the solenoid 234 operating to eject a quarter.

Assume that the party purchasing the slug finds for some reason that he does not need it. This slug may then be inserted in slot 200 to bridge contacts 270. The current will flow through wire 271, solenoid 225 to energize it, wire 272, wire 243, source of current supply 244, key-operated lock switch 87, to wire 273. Energizing solenoid 225 will actuate coin ejector finger 218 to operate coin ejector 215 dispensing nickels from the nickel coin chamber 206. Actuation of coin ejector finger 218 will not engage, as previously explained, the mechanism to cause actuation of registering mechanism 217. However, movement of the coin ejector finger 218 causes operation of registering mechanism 218'. Thus, the machine will record the number of slugs deposited in slot 200 and the number of nickels paid out therefor. The machine will also record the initial purchases of the slugs. The number of slugs actually dispensed will be the difference between the readings of registering mechanism 217 and registering mechanism 218'.

A novel feature of the structure shown comprises arranging the locking mechanism 80 controlling switch 87 and locking mechanism 280 controlling door 11 so that either the circuit must be broken at switch 87 if door 11 is to be opened or the door 11 must be closed if the circuit at switch 87 is to be closed. This is accomplished by providing a single key 8 for both locks 80 and 280, and constructing lock mechanism 80 so that the key cannot be removed from keyhole 9 when switch 87 is closed and locking mechanism 280 so that this key 8 cannot be removed from keyhole 10 when door 11 is opened. It is therefore impossible to operate the machine when coin carrier 15 is accessible or to operate the machine when coin carrier 15 is removed. If a party should drop a coin in any of slots 1 to 4, inclusive, when coin carrier 15 is removed, the previous coin appearing at the window in the chutes will drop downwardly and might cause a short circuit or jamming of the operating parts. Furthermore, the arrangement permits the operator to remove coin carrier 15 in the same condition as it is at any time it may be out of order. This will allow the operator to determine the cause of the trouble. If the machine may be operated after trouble arises, it is quite apparent that the setting of the parts occurring at the time of trouble might be changed so as to render it difficult to ascertain thereafter the cause for the disorder.

Without further elaboration, the foregoing will so fully explain the gist of my invention that others may, by applying current knowledge, readily adopt the same for use under varying conditions of service, without eliminating certain features which may properly be said to constitute the essential items of novelty involved, which items are intended to be defined and secured to me by the following claims.

I claim:

1. In a change making machine, chutes for receiving deposited coins of different denominations, chambers for receiving the deposited coins after passing through said chutes, a window for said chutes, and means for retaining each coin as deposited at said window and for releasing it therefrom for passage into a chamber upon the deposit of another coin in any one of said chutes.

2. In a change making machine, chutes for receiving deposited coins of different denominations, chambers for receiving the deposited coins after passing through said chutes, a window for said chutes, means for retaining each coin as deposited at said window, fare registering and change making mechanism adapted to be actuated by the passage of each coin through said chutes before being retained at said window, and means operated by said mechanism upon subsequent operation by the deposit of another coin for releasing said retaining means whereby to drop the coin retained into one of said chambers.

3. In a change making machine, chutes for receiving deposited coins of different denominations, chambers for receiving the deposited coins after passing through said chutes, a window for said chutes, means for retaining each coin as deposited at said window, fare registering and change making mechanism adapted to be actuated by the passage of each coin through said chutes before being retained at said window, means for releasing said retaining means whereby to drop the coin retained into one of said chambers upon the deposit of the next coin of any denomination, and means for preventing the deposit of the next coin if any of said chambers are empty.

4. In a change making machine, chutes for receiving deposited coins of different denominations, chambers for receiving the deposited coins of different denominations after passing through said chutes, a window for said chutes, a pivoted retaining pin for each chute normally projecting therein for retaining at said window each coin as deposited, fare registering and change making mechanism adapted to be actuated by the passage of each coin through said chutes before being retained at said window, and an element actuable by said fare registering mechanism for withdrawing said pivoted pins whereby to drop the coin retained into its proper chamber upon deposit of another coin of any denomination in said chutes.

5. In a change making machine, chutes for receiving deposited coins of different denominations, chambers for receiving the deposited coins of different denominations after passing through said chutes, a window for said chutes, a pivoted retaining pin for each of said chutes normally projecting therein for retaining at said window each coin as deposited, irrespective of denomination, fare registering and change making mechanism adapted to be actuated by the passage of each coin through said chutes before being retained at said window, a rod actuable by said change-making mechanism to actuate said fare registering mechanism, and a device operable by said rod to effect movement of said retaining pins whereby to drop the coin retained into its proper chamber upon deposit in said chutes of another coin of any denomination.

6. In a change making machine adapted to receive coins of different denominations, chutes for receiving deposited coins of different denominations, a window for said chutes, means for retaining a single coin in the chute of its denomination before said window, and means for releasing said retaining means to discharge the deposited coin from said window upon deposit of another coin of any denomination.

7. In a change making machine adapted to receive coins of different denominations, chutes for receiving deposited coins of different denominations, a window for said chutes, means for retaining a single coin in the chute of its denomination before said window, fare registering and change making mechanisms adapted to be actuated by the passage of each coin through said chutes before reaching said window, said change making mechanism collecting fare of a predetermined value from each coin deposited and returning coin in excess of the value of the coin so deposited, said fare registering mechanism recording each collection, and means controlled by said fare registering mechanism for releasing the deposited coin retained at said window upon deposit of any coin of any denomination.

8. In a change making machine adapted to receive coins of different denominations, chutes for receiving deposited coins of different denominations, a window for said chutes, means for retaining a single coin before said window, means for releasing said retaining means to discharge the deposited coin from said window upon deposit of another coin of proper denomination in any of said chutes, and means also operable to release said retaining means to clear said machine of the last deposited coin.

9. In a change making machine adapted to receive coins of different denominations, chutes for receiving deposited coins of different denominations, a coin carrier having a chamber for each denomination of coin deposited in said chutes, a coin ejector for each chamber, means for actuating said coin ejectors, means for locking a coin ejector against movement when its coin chamber is empty, and means actuable by said last means to prevent insertion of coins in said chutes.

10. In a change making machine adapted to receive coins of different denominations, chutes for receiving deposited coins of different denominations, a coin carrier having a chamber for each chute, a coin ejector for each chamber, means for actuating said coin ejectors, a series of coin ejector lock members, one for each ejector, to lock the ejectors against coin ejecting movement, and a pivoted arm or the like having members adapted to lock chutes against insertion of coins, any one of said coin ejector lock members operating said pivoted arm when its coin chamber is empty.

11. In a change making machine adapted to receive coins of different denominations, chutes for receiving deposited coins of different denominations, a coin carrier having a chamber for each chute, a coin ejector for each chamber, means for actuating said coin ejectors, a coin ejector lock member for each coin ejector adapted to lock the coin ejector against coin ejecting movement when its chamber is empty, a pivoted arm arranged for actuation by any one of said coin ejector lock members, means operated by said pivoted arm to prevent insertion of coin in said chutes when any one of the chambers is empty and its coin ejector is locked against movement by its coin ejector lock member, and key operated locking mechanism for actuating said pivoted arm to prevent insertion of coin in said chutes when the key is removed from said locking mechanism.

EDWIN W. WILSON.